US011025401B2

United States Patent
Kadiri et al.

(10) Patent No.: US 11,025,401 B2
(45) Date of Patent: Jun. 1, 2021

(54) SECONDARY CELL CONFIGURATION SIGNALING AND ACTIVATION FIELD

(71) Applicant: QUALCOMM Incorporated, San Diego, CA (US)

(72) Inventors: Prasad Kadiri, San Diego, CA (US); Masato Kitazoe, Hachiouji (JP); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 253 days.

(21) Appl. No.: 15/957,526

(22) Filed: Apr. 19, 2018

(65) Prior Publication Data

US 2019/0036672 A1    Jan. 31, 2019

Related U.S. Application Data

(60) Provisional application No. 62/538,542, filed on Jul. 28, 2017.

(51) Int. Cl.
    *H04W 76/27*   (2018.01)
    *H04W 24/10*   (2009.01)
    (Continued)

(52) U.S. Cl.
    CPC .......... *H04L 5/0098* (2013.01); *H04W 24/10* (2013.01); *H04W 36/0072* (2013.01);
    (Continued)

(58) Field of Classification Search
    CPC ............. H04W 24/10; H04W 36/0058; H04W 36/0069; H04W 36/0072; H04W 48/12; H04W 76/20; H04W 76/27; H04L 5/0098
    See application file for complete search history.

(56) References Cited

U.S. PATENT DOCUMENTS

| 9,237,537 B2 * | 1/2016 | Dinan | H04W 72/042 |
| 2013/0343297 A1 * | 12/2013 | Dinan | H04W 72/042 370/329 |

(Continued)

FOREIGN PATENT DOCUMENTS

| EP | 2849357 A1 * | 3/2015 | H04L 5/001 |
| EP | 2849357 A1 | 3/2015 | |

(Continued)

OTHER PUBLICATIONS

Ericsson: "NR RRC Connection Reconfiguration Procedure and Signaling Baseline",3GPP Draft, R2-1707201—RRC Connection Reconfiguration Procedure and Signalling Baseline, 3rd Generation Partnership Project (3GPP), Mobile Competence Centre, 650, Route Des Lucioles, F-06921 Sophia,vol. RAN WG2, No. Qingdao; Jun. 27, 2017-Jun. 29, 2017, Jun. 26, 2017 (Jun. 26, 2017), XP051301695, pp. 1-10, Retrieved from the Internet URL:http://www.3gpp.org/ftp/Meetings_3GPP_SYNC/RAN2/Docs/ [retrieved on Jun. 26, 2017].

(Continued)

*Primary Examiner* — Brian P Cox
(74) *Attorney, Agent, or Firm* — Patterson + Sheridan, L.L.P.

(57) ABSTRACT

Certain aspects of the present disclosure relate to techniques for secondary cell (SCell) configuration signaling and activation procedures. For example, certain aspects provide a method for configuring a plurality of secondary cells of a base station for a user equipment. The method includes receiving, at the user equipment from the base station, a message including at least one configuration parameter applicable to the plurality of secondary cells. The method further includes configuring the user equipment for the plurality of secondary cells based on the at least one configuration parameter.

26 Claims, 13 Drawing Sheets

(51) Int. Cl.
| | |
|---|---|
| *H04L 5/00* | (2006.01) |
| *H04W 48/12* | (2009.01) |
| *H04W 76/20* | (2018.01) |
| *H04W 36/00* | (2009.01) |
| *H04W 36/04* | (2009.01) |

(52) U.S. Cl.
CPC ........... *H04W 36/04* (2013.01); *H04W 48/12* (2013.01); *H04W 76/20* (2018.02); *H04W 76/27* (2018.02); *H04W 36/0058* (2018.08); *H04W 36/0069* (2018.08)

(56) References Cited

U.S. PATENT DOCUMENTS

| | | | |
|---|---|---|---|
| 2014/0086127 | A1 | 3/2014 | Kim et al. |
| 2016/0205681 | A1 | 7/2016 | Kim et al. |
| 2016/0337910 | A1* | 11/2016 | Werner ................. H04W 72/04 |
| 2019/0037458 | A1 | 1/2019 | Kadiri et al. |
| 2019/0075478 | A1* | 3/2019 | Lunden ................. H04W 24/10 |
| 2020/0068463 | A1 | 2/2020 | Da Silva et al. |

FOREIGN PATENT DOCUMENTS

| | | |
|---|---|---|
| EP | 3282792 A1 | 2/2018 |
| WO | 2016163059 A1 | 10/2016 |

OTHER PUBLICATIONS

International Search Report and Written Opinion—PCT/US2018/044087—ISA/EPO—dated Jan. 7, 2019.

Qualcomm Incorporated: "Signalling Optimization for SCell Configuration and Handover",3GPP Draft, R2-1707789_Scell Configuration Optimization_CA HO Optimization, 3rd Generation Partnership Project (3GPP), Mobile Competence Centre, 650, Route Des Lucioles, F-06921 Sophia-Antipolis Cedex, vol. RAN WG2, No. Berlin, Germany, Aug. 21, 2017-Aug. 25, 2017, Aug. 20, 2017 (Aug. 20, 2017), XP051317749, 8 Pages, Retrieved from the Internet URL:http://www.3gpp.org/ftp/Meetings_3GPP_SYNC/RAN2/Docs/ [retrieved on Aug. 20, 2017].

Fujitsu., "HO and CC Handling", 3GPP Draft, R2-103078, 3rd Generation Partnership Project (3GPP), Mobile Competence Centre, 650, Route Des Lucioles, F-06921 Sophia-Antipolis Cedex, France, vol. RAN WG2, No. Montreal, Canada, May 10, 2010, May 4, 2010 (May 4, 2010), XP050423244, [retrieved on May 4, 2010].

Qualcomm Incorporated., "Fast SCell Configuration and Activation Through network assisted RRC_Idle mode measurements", 3GPP Draft, R2-1710152_Fastscellconfigurationandactivation_Quickmeasrepo Rting_V1, 3rd Generation Partnership Project (3GPP), Mobile Competence Centre, 650, Route Des Lucioles, F-06921 Sophiaantipol, vol. RAN WG2, No. Prague, Czech Republic, Oct. 9, 2017-Oct. 13, 2017 Oct. 8, 2017 (Oct. 8, 2017), XP051342219, Retrieved from the Internet: URL:http://www.3gpp.org/ftp/Meetings_3GPPSYNC/RAN2/Docs/ [retrieved on Oct. 8, 2017].

* cited by examiner

SECONDARY CELL CONFIGURATION SIGNALING AND ACTIVATION FIELD

CROSS-REFERENCE TO RELATED APPLICATIONS

This application claims the benefit of U.S. Provisional Patent No. 62/538,542, filed Jul. 28, 2017. The content of the provisional application is hereby incorporated by reference in its entirety.

INTRODUCTION

Certain aspects of the present disclosure generally relate to wireless communications and, more particularly, to techniques for secondary cell (SCell) configuration signaling and activation procedures.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, Long Term Evolution Advanced (LTE-A) systems, Orthogonal Frequency Division Multiple Access (OFDMA) systems, 5th generation wireless systems (5G), and new radio (NR) wireless systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

Since terminals may be mobile, the terminals may move between coverage areas of different base stations. Further, the terminals may be actively communicating within the wireless communication system while moving between such coverage areas. Accordingly, the wireless multiple-access communication system may support performing a handover of the connection used by the terminal to communicate in the wireless communication system from a source base station to a target base station so that the terminal does not experience a drop in the connectivity as it moves between coverage areas.

SUMMARY

Certain aspects of the present disclosure provide a method for signaling configuration information for a plurality of secondary cells of a base station. The method includes generating, at the base station, a message including at least one configuration parameter applicable to the plurality of secondary cells. The method includes transmitting the message from the base station to one or more user equipments.

Certain aspects of the present disclosure provide a method for configuring a plurality of secondary cells of a base station for a user equipment. The method includes receiving, at the user equipment from the base station, a message including at least one configuration parameter applicable to the plurality of secondary cells. The method includes configuring the user equipment for the plurality of secondary cells based on the at least one configuration parameter.

Certain aspects of the present disclosure provide a method for signaling activation of a user equipment for one or more secondary cells of a target base station during a handover procedure. The method includes receiving a handover request for the user equipment at the target base station. The method includes receiving a measurement report for the one or more secondary cells. The method includes determining the one or more secondary cells of the target base station to activate for the user equipment based on the handover request and the measurement report. The method includes transmitting secondary cell activation information for the user equipment from the target base station prior to completion of handover of the user equipment to the target base station, wherein the secondary cell activation information indicates the one or more secondary cells.

Certain aspects of the present disclosure provide a method for activating at a user equipment one or more secondary cells of a target base station during a handover procedure. The method includes transmitting a measurement report for the one or more secondary cells. The method includes receiving secondary cell activation information for the user equipment from the target base station prior to completion of handover of the user equipment to the target base station, wherein the secondary cell activation information indicates the one or more secondary cells. The method includes activating the one or more secondary cells at the user equipment after completion of handover to the target base station.

Certain aspects of the present disclosure provide a user equipment. The user equipment includes a memory and a processor. The processor is configured to receive from a base station a message including at least one configuration parameter applicable to a plurality of secondary cells of the base station. The processor is further configured to configure the user equipment for the plurality of secondary cells based on the at least one configuration parameter.

Certain aspects of the present disclosure provide a user equipment. The user equipment includes means for receiving from a base station a message including at least one configuration parameter applicable to a plurality of secondary cells of the base station. The user equipment further includes means for configuring the user equipment for the plurality of secondary cells based on the at least one configuration parameter.

Certain aspects of the present disclosure provide a non-transitory computer-readable medium having instructions stored thereon that when executed by a processor cause the processor to perform a method for configuring a plurality of secondary cells of a base station for a user equipment. The method includes receiving, at the user equipment from the base station, a message including at least one configuration parameter applicable to the plurality of secondary cells. The method further includes configuring the user equipment for the plurality of secondary cells based on the at least one configuration parameter.

Aspects generally include methods, apparatus, systems, computer program products, computer-readable medium, and processing systems, as substantially described herein with reference to and as illustrated by the accompanying drawings. "LTE" refers generally to LTE, LTE-Advanced (LTE-A), LTE in an unlicensed spectrum (LTE-U), etc.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
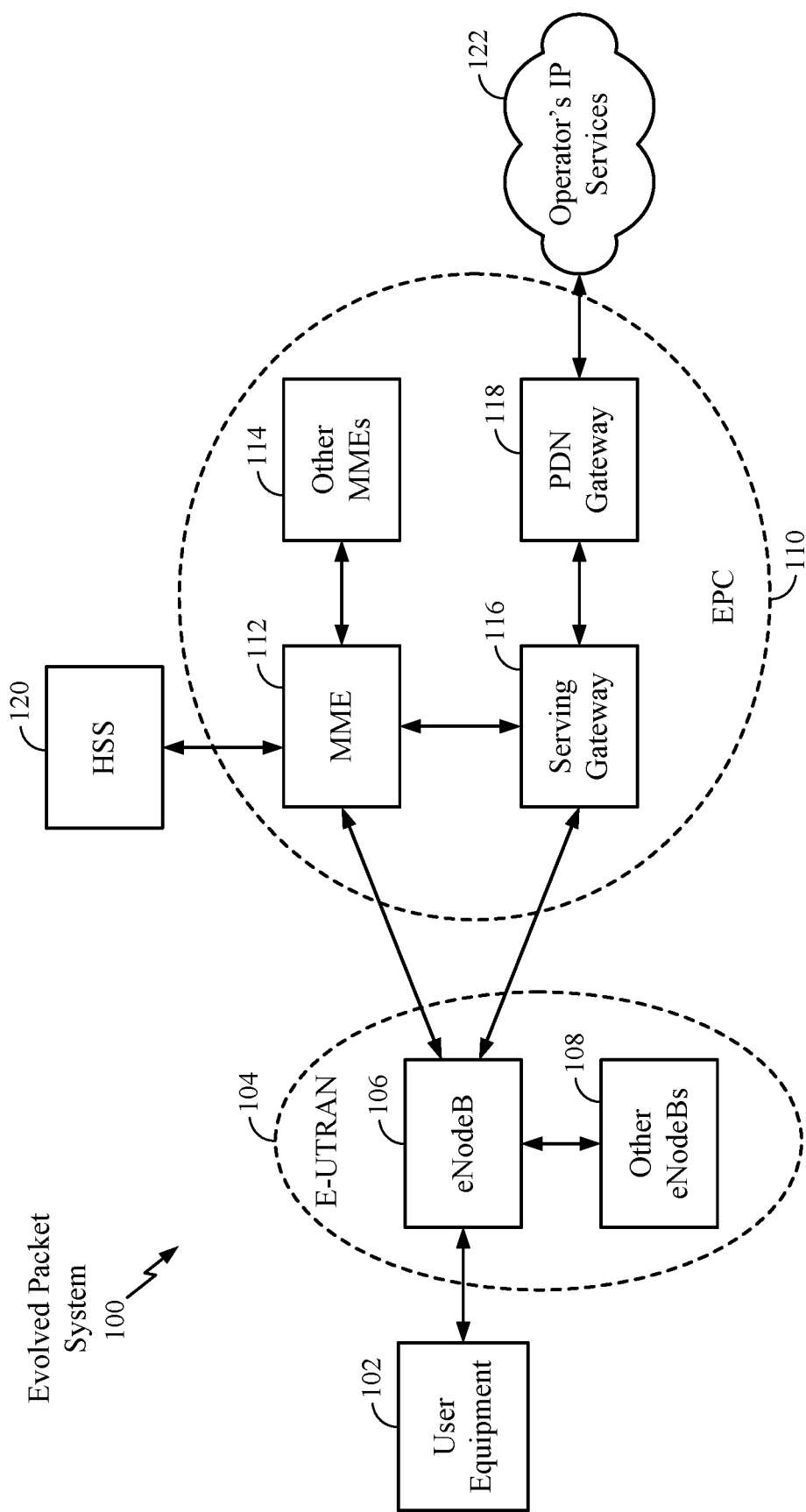
FIG. 1 is a diagram illustrating an example of a network architecture.

According to aspects of the present disclosure, techniques are provided for (e.g., optimizing) signaling of secondary cell (SCell) configuration from a base station to user equipments (UEs). In particular, in certain aspects, a base station is configured to provide configuration information for multiple secondary cells supported by the base station to UEs in a single information element (IE) or message (e.g., as opposed to separate IEs or messages for each secondary cell). In certain aspects, the configuration information may be common to all UEs served by the multiple secondary cells. In certain aspects, the configuration information may be specific to each UE (or subset or group of UEs) served by the multiple secondary cells. In certain aspects, the configuration information that is specific to each UE takes precedence over configuration information that is common to all UEs if the configuration information conflicts. In certain aspects, cell specific configuration information takes precedence over configuration information common to multiple secondary cells if the configuration information conflicts. In certain aspects, the base station supports multiple groups of secondary cells, each group of secondary cells comprising multiple secondary cells. In certain aspects, the base station is further configured to include in the message different configuration information for multiple groups of secondary cells, including both configuration common to all UEs served by the group and configuration information specific to one or more UEs served by the group.

Further, according to aspects of the present disclosure, techniques are provided to directly activate secondary cells for a UE by a base station such as during a handover procedure of the UE from a source base station to a target base station (e.g., as opposed to all secondary cells being deactivated after completion of the handover procedure), or during initial secondary cell configuration (e.g., as opposed to all secondary cells being deactivated after completion of the initial secondary cell configuration).

Though aspects of the present disclosure are described with respect to LTE systems, the aspects may also be used for other appropriate wireless communication networks, including other yet to be defined wireless communication networks, such as those implementing 5G systems, NR, and systems using different types of radio technologies. For example, though base stations are described as single devices, they may instead be made up of multiple distributed units or devices.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set, an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, a drone, a robot, a sensor, a monitor, a meter, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
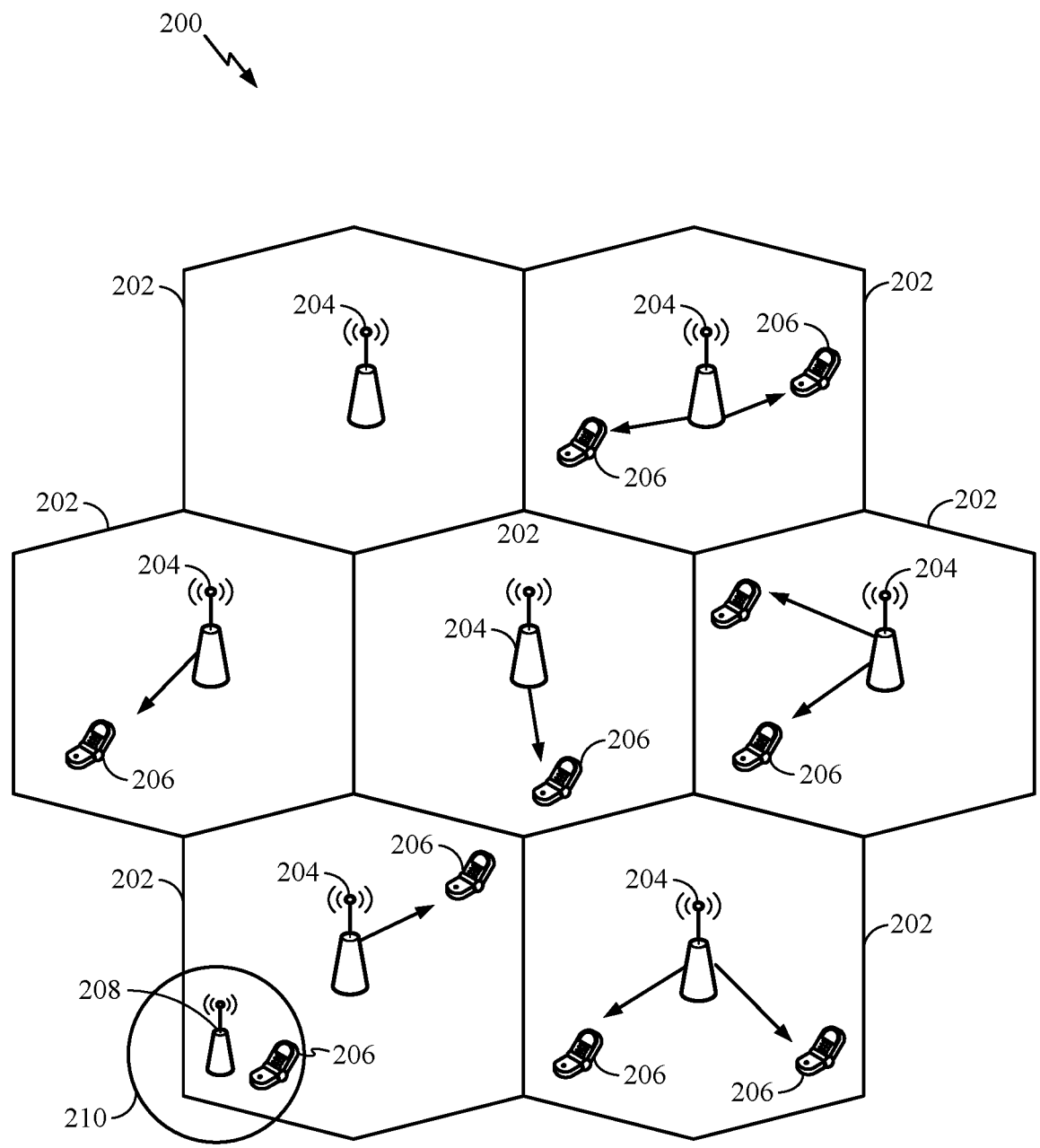
FIG. 2 is a diagram illustrating an example of an access network.

FIG. 2 is a diagram illustrating an example of an access network 200 in an LTE network architecture in which aspects of the present disclosure may be practiced.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

Since UEs 206 may be mobile, they may move from a cell 202/region 210 associated with one eNB 204/208 to a cell 202/region 210 associated with another eNB 204/208. Further, the UE 206 may have an active session, (e.g., ongoing call or data session) during the movement from one cell 202/region 210 to another. For example, a UE 206 may be moving away from one eNB 204/208 and toward another eNB 204/208, while in a session and communicating in the network 200. Accordingly, the UE 206 may move out of one cell 202/region 210 and into another cell 202/region 210. In order to maintain the session, therefore, the UE 206 may need to have the session handed over from the source eNB 204/208 to the target eNB 204/208, so that the UE 206 can communicate via the target eNB 204/208. Such a handover may occur, for example, while the 206 is in an area covered by both the source eNB 204/208 and the target eNB 204/208, meaning the UE 206 is able to communicate with both the source eNB 204/208 and the target eNB 204/208. In certain aspects, the techniques described herein relate to handover of the UE from a source eNB (i.e., source base station) to a target eNB (i.e., target base station).

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDM. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
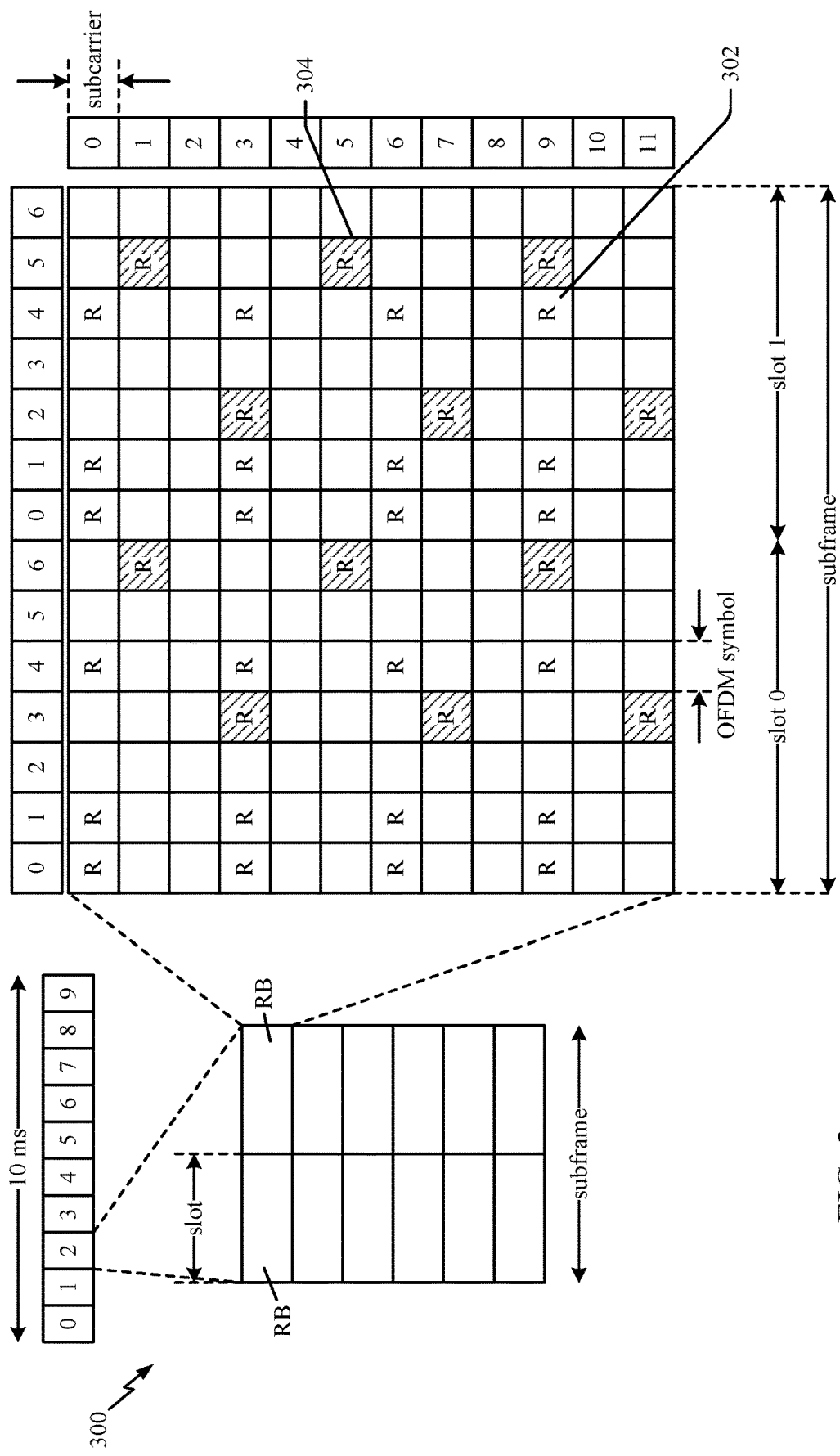
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Since each sub-frame is made up of 2 time slots, and thus 2 resource blocks, each sub-frame includes 14 OFDM symbols. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, in certain aspects, an eNB may send a primary synchronization signal (PSS) and a secondary synchronization signal (SSS) for each cell in the eNB. The synchronization signals may be used by UEs for cell detection and acquisition. The eNB may also send a Physical Broadcast Channel (PBCH). The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
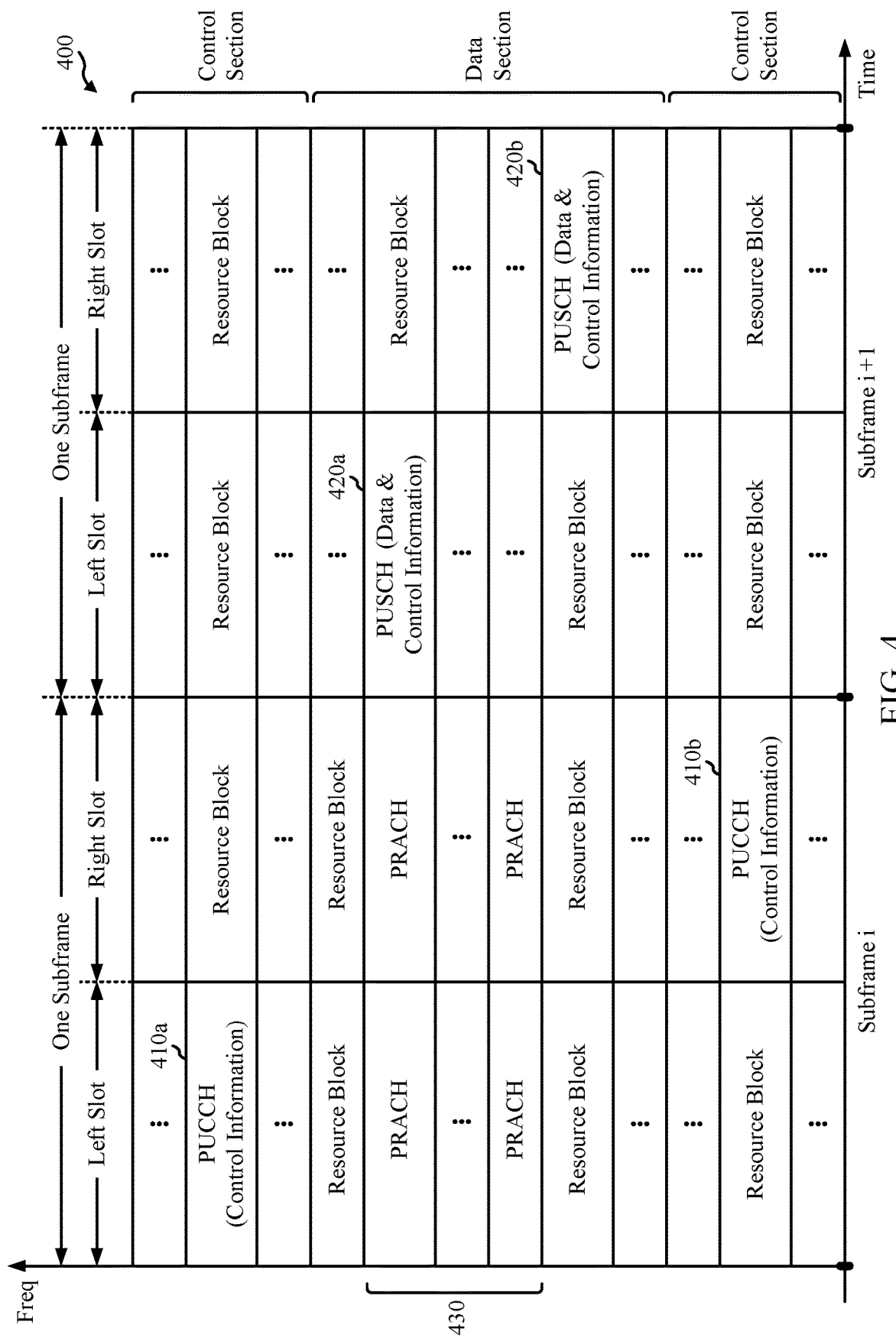
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
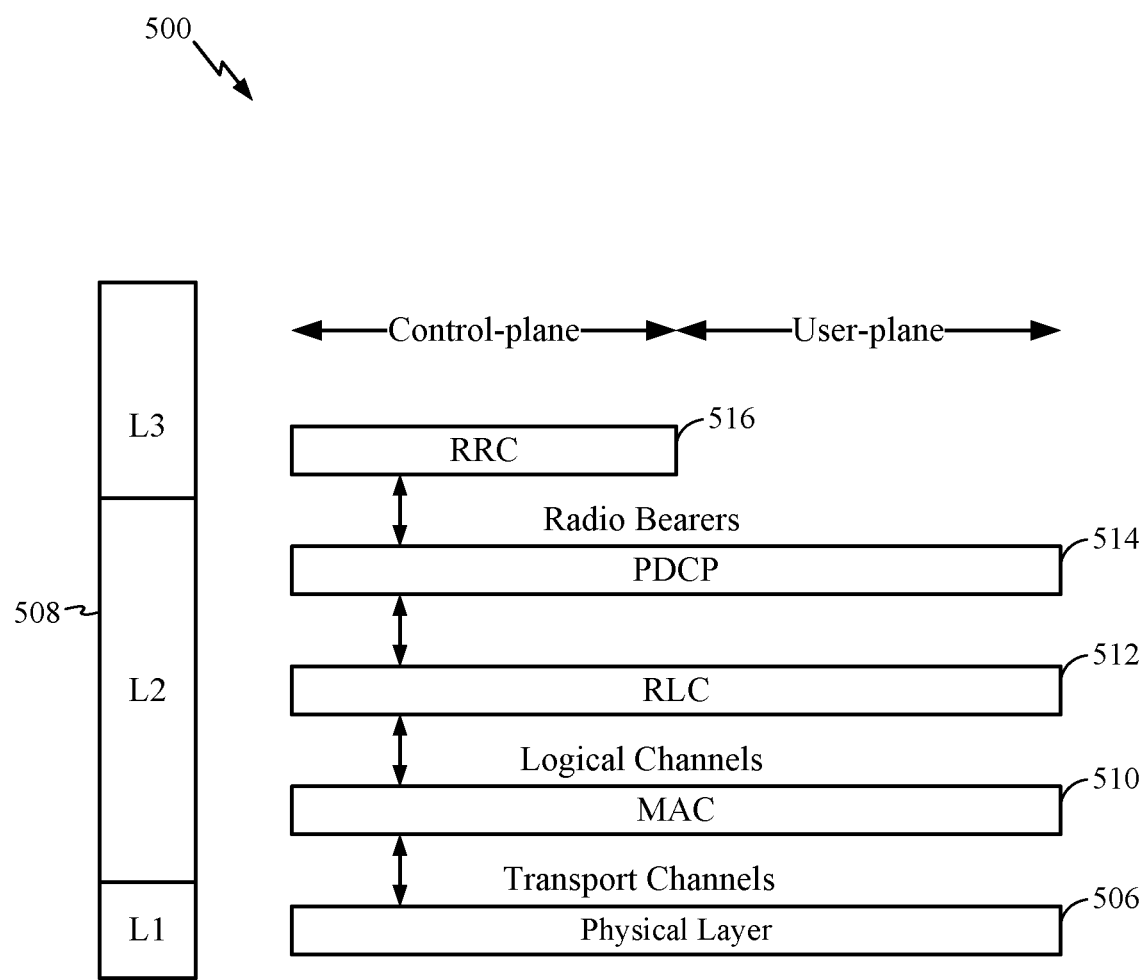
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
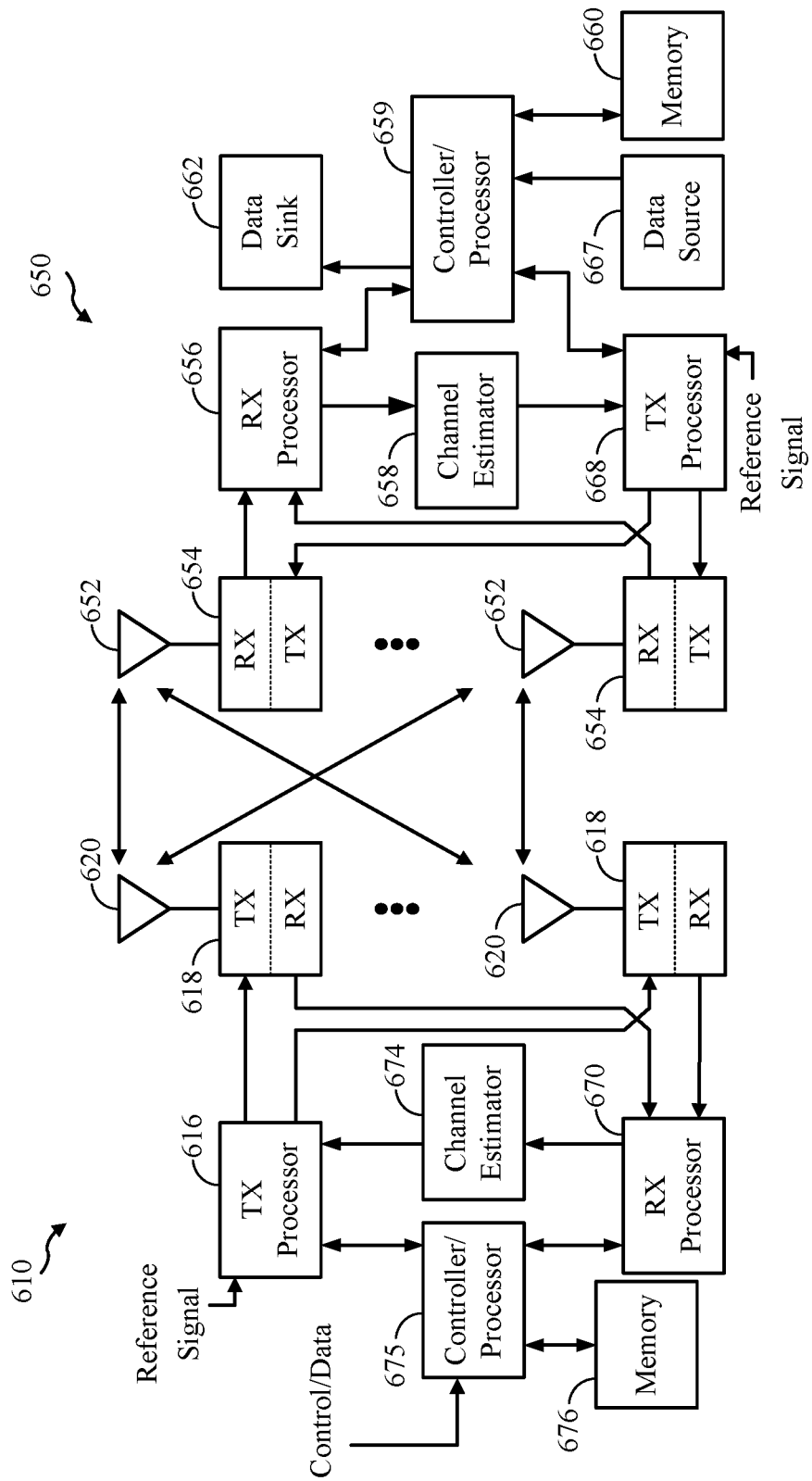
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network, in which aspects of the present disclosure may be practiced.

In the DL, upper layer packets from the core network are provided to a controller/processor 675. The controller/processor 675 implements the functionality of the L2 layer, for example. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer), for example. The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer, for example. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer, for example. The controller/processor 659 can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659, for example. The data source 667 represents all protocol layers above the L2 layer, for example. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610, for example. The controller/processor 659 is also responsible for HARQ operations, retransmission of lost packets, and signaling to the eNB 610, for example.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer, for example.

The controller/processor 675 implements the L2 layer, for example. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operations at the eNB 610 and the UE 650, respectively.

The controller/processor 659 and/or other processors, components and/or modules at the UE 650 may perform or direct operations and/or other processes or techniques described herein. The controller/processor 675 and/or other processors, components and/or modules at the eNB 610 may perform or direct operations and/or other processes or techniques described herein. In certain aspects, one or more of any of the components shown in FIG. 6 may be employed to perform operations, and/or other processes for the techniques described herein. The memories 660 and 676 may store data and program codes for the UE 650 and eNB 610 respectively, accessible and executable by one or more other components of the UE 650 and the eNB 610.

Example Secondary Cell Configuration Signaling

In certain aspects, a base station (e.g., eNB 106, eNB 204, eNB 610, etc.) may support carrier aggregation (CA), meaning the base station can communicate on multiple frequencies (e.g., multiple ranges of frequencies of one or more bandwidths) referred to as carriers, or component carriers (CCs). These carriers may or may not be contiguous in frequency. When CA is used by the base station, the base station supports a plurality of serving cells, one for each carrier. The coverage area of each serving cell may differ. In certain aspects, radio resource control (RRC) connection procedures for the UE connecting to the base station are handled by the base station using only one of the carriers (referred to as a primary carrier), which serves one of the cells referred to as the primary cell (PCell). The remaining cells are referred to as SCells and are served by the remaining carriers (referred to as secondary carriers).

In certain aspects, a UE (e.g., UE 102, UE 206, UE 650, etc.) that supports CA is configured to indicate it is capable of CA to a base station. For example, UE 102 may indicate (e.g., in a message) to eNB 106 that serves UE 102 that it is capable of CA. In certain aspects, UE 102 indicates CA capabilities via RRC in the PCell to eNB 106 as part of UE capability information.

The eNB 106 may then configure use of one or more SCells of the eNB 106 by the UE 102 (e.g., during an initial cell configuration of the UE 102, when the UE 102 connects to the eNB 106 initially, when the UE 102 (re)connects to the eNB 106 after a radio link failure (RLF), during a handover procedure, etc.). For example, the eNB 106 may include SCell configuration information in one or more messages (e.g., RRC Reconfiguration messages) sent to the UE 102. The eNB 160 may configure the UE 102 for communicating on one or more SCells with or without receiving channel measurements (e.g., signal to noise ratio (SNR), channel quality indicator (CQI), RSSI, RSRP, RSRQ, etc.) from the UE 102 for the one or more SCells.

When the UE 102 is configured to use one or more SCells by the eNB 106, the SCells may initially be in a deactivated state for the UE 102 (e.g., the SCells are not used by the UE 102 for communication with the eNB 106) by default in certain aspects. For example, UE 102 does not monitor the PDCCH of a SCell, perform uplink (UL) sounding reference signal (SRS) transmissions in the SCell, perform channel state information (CSI) (e.g., CQI/PMI/RI) reporting for the SCell, or perform PDSCH reception/PUSCH transmission in the deactivated state. The eNB 106 may instead direct activation of SCells for the UE 102. For example, the eNB 106 may be configured to send commands or control information (e.g., as a medium access control (MAC) control element (CE)) to activate SCells for the UE 102. When a SCell is activated for the UE 102, the UE 102 is configured to monitor the PDCCH of the SCell (e.g., during a connected mode discontinuous reception (cDRX) mode on state of the UE 102). In certain aspects, the cDRX is common between the PCell and SCells of the eNB 106. Further, when a SCell is activated for the UE 102, the UE 102 may be configured to perform uplink (UL) sounding reference signal (SRS) transmissions in the SCell, perform channel state information (CSI) (e.g., CQI/PMI/RI) reporting for the SCell, and/or perform PDSCH reception/PUSCH transmission.

The eNB 106 may further be capable of releasing SCell configuration of the UE 102 through a message sent to the UE 102 (e.g., a RRC Reconfiguration message). In certain aspects, a SCell may go from an activated to deactivated state for a UE 102, such as during handover or due to expiration of a MAC CE or other timer (e.g., SCellDeactivation timer started when the SCell is activated) at the UE 102.

Figure 7:
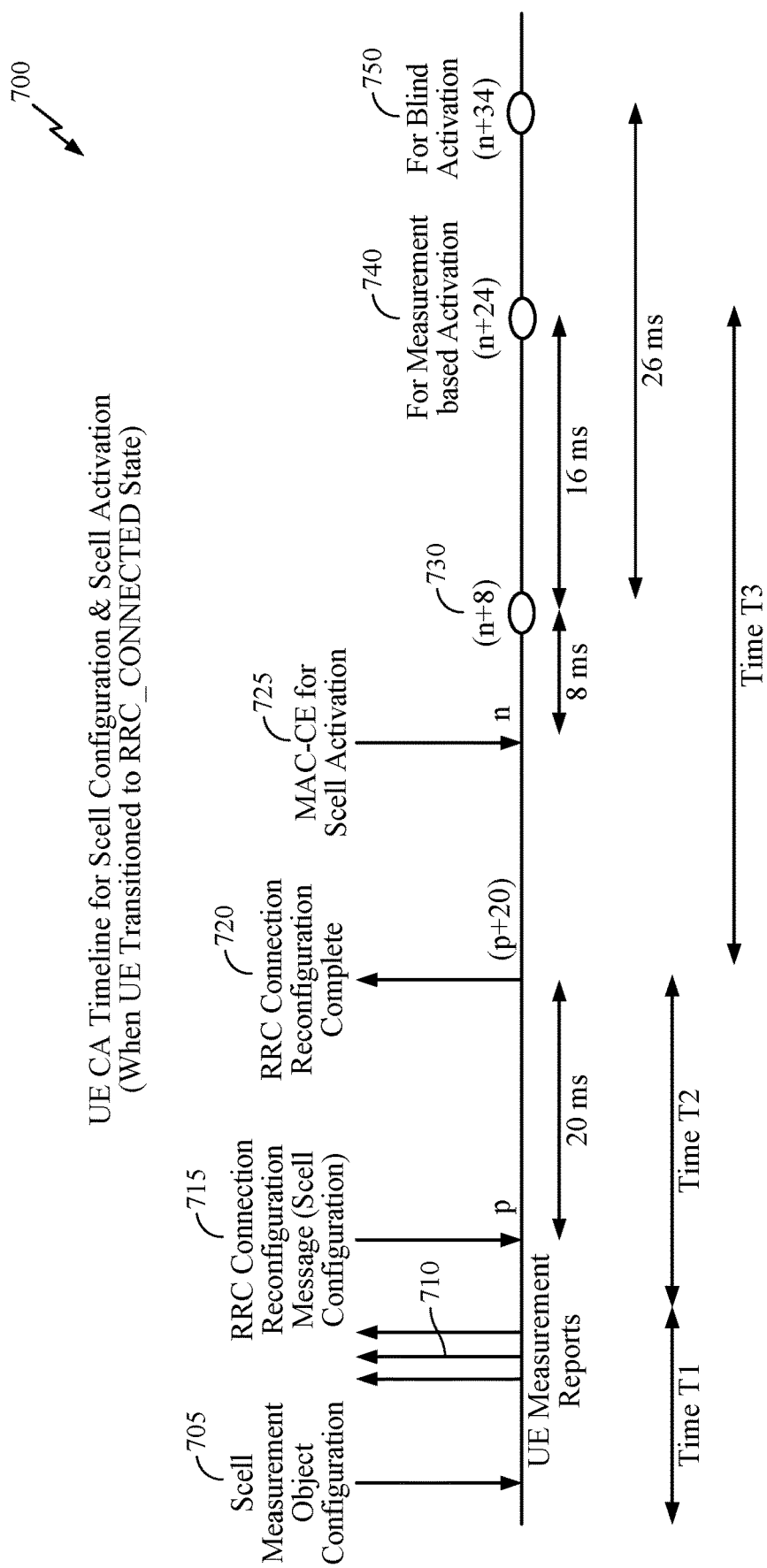
FIG. 7 illustrates an example signal flow diagram for signaling between an eNB and UE for SCell configuration and activation, in accordance with certain aspects of the present disclosure.

FIG. 7 illustrates an example signal flow diagram 700 for signaling between eNB 106 and UE 102 for SCell configuration and activation.

At 705, eNB 106 transmits a message (e.g., SCell measurement object configuration message) to UE 102 requesting a measurement report for signal strength information (e.g., RSSI, RSRP, RSRQ, SNR, CQI, etc.) based on measurement criteria thresholds of one or more SCells served by the eNB 106. At 710, UE 102 transmits the measurement reports to the eNB 106 (e.g., in the PCell) when UE meets SCell measurement criteria. At 715, based on the measurement reports, the eNB 106 sends a message (e.g., a RRC Reconfiguration message) to the UE 102 to configure one or more of the SCells served by the eNB 106 for the UE 102. The message may indicate all or a subset of the SCells serviced by the eNB 106. For example, the message may only indicate SCells for which the measurement reports indicate that the signal strength associated with the SCell satisfies a threshold. When the UE 102 finalizes configuration of the one or more SCells in the deactivated state, at 720, UE 102 transmits a message (e.g., RRC reconfiguration complete message) to the eNB 106 indicating configuration is complete. At 725, eNB 106 activates all or a subset of the SCells for which the UE 102 is configured by transmitting one or more messages (e.g., MAC CE) to the UE 102 to activate the SCells. After receiving the message, UE 102 activates the SCells within a number of frames at 730, 740, or 750 (e.g., 8 frames, 24 frames (for measurement based activation), or 34 frames (for blind activation)).

In certain aspects, eNB 106 may support a large number of SCells (e.g., up to 31 SCells for LTE Rel-13). Accordingly, eNB 106 may need to configure a large number of SCells for UEs served by the eNB 106. This may lead to an increased number of SCells configured in each message (e.g., RRC reconfiguration message) transmitted by the eNB 106, which may increase payload size of the message.

In certain aspects, the message (e.g., RRC reconfiguration message) includes separate information (e.g., information element (IEs)) (e.g., SCellToAddMod-r10 or SCellToAddModExt-r13 IEs) for separate SCells to be configured for UEs. In certain aspects, for each SCell, the message includes single SCell common information (e.g., radioResourceConfigCommonSCell-r10 or radioResourceConfigCommonSCell-r13 IEs) that define parameters (e.g., including parameters identified in 3GPP TS 36.331, RRC specification) for SCell configuration that are common to all UEs in the SCell.

In certain aspects, for each SCell, the message includes single SCell dedicated information (e.g., radioResourceConfigDedicatedSCell-r10 or radioResourceConfigDedicatedSCell-r13 IEs) that define parameters (e.g., including parameters identified in 3GPP TS 36.331, RRC specification) for SCell configuration that are specific to one or more UEs (i.e., less than all UEs) in the SCell. The one or more UEs may be identified by one or more UE identifiers included in the single SCell dedicated information. In certain aspects, the single SCell dedicated information takes precedence over the single SCell common information for a SCell if the configuration information between the two conflicts. For example, if the single SCell common information indicates a certain setting or value for a parameter for the SCell for all UEs, and the single SCell dedicated information indicates a different setting or value for the same parameter for the same SCell for one or more UEs, the one or more UEs use the setting or value indicated in the single SCell dedicated information.

If there are a large number of SCells, indicating separate information for each SCell in the configuration message (e.g., RRC reconfiguration message) sent from the eNB 106 to the UE 102 may increase the size of the payload of the configuration message. Accordingly, certain aspects herein relate to including configuration information that is applicable to multiple SCells in the configuration message. In such aspects, parameters may be included once for multiple SCells instead of multiple times for separate SCells. In certain aspects, the multiple SCells may be all SCells of the eNB 106. In certain aspects, the multiple SCells may be a subset or group of SCells of the eNB 106. For example, the eNB 106 may divide its SCells into multiple groups of SCells, each group of SCells comprising multiple secondary cells with common parameters. Accordingly, certain aspects herein relate to including multiple configuration information, where each is applicable to a group of SCells, in the configuration message. The configuration information for each group may be identified by an identifier of the group in the configuration message. For example, in certain aspects the configuration message may include multiple SCell common information (e.g., an information element) (e.g., radioResourceConfigCommonMultipleSCells IE) indicating parameters (e.g., including parameters identified in 3GPP TS 36.331, RRC specification) for SCell configuration that are applicable to all UEs served by the eNB 106 for multiple SCells (e.g., a subset of SCells as identified in the multiple SCell common information (e.g., by cell ID, etc.), all SCells, etc.). In certain aspects, all the UEs receiving the multiple SCell common information may be configured to utilize the parameters received for each SCell indicated by the multiple SCell common information for SCell configuration. In certain aspects, single SCell common information may also be included in the configuration message. In certain aspects, the single SCell common information may be used to indicate certain parameters for SCell configuration not indicated in the multiple SCell common information.

In certain aspects, single SCell common information may take precedence over multiple SCell common information. For example, if the single SCell common information indicates a certain setting or value for a parameter for a single SCell for all UEs, and the multiple SCell common information indicates a different setting or value for the same parameter for multiple SCells including the single SCell for all UEs, the UEs use the setting or value indicated in the single SCell common information for configuration of the single SCell.

In certain aspects the configuration message may include multiple SCell dedicated information (e.g., an information element) (e.g., radioResourceConfigDedicatedMultipleS-Cells IE) indicating parameters (e.g., including parameters identified in 3GPP TS 36.331, RRC specification) for SCell configuration that are applicable to specific one or more UEs (i.e., less than all UEs) served by the eNB 106 for multiple SCells (e.g., a subset of SCells as identified in the multiple SCell common information (e.g., by cell ID, etc.), all SCells, etc.). The one or more UEs may be identified by one or more UE identifiers included in the multiple SCell dedicated information. In certain aspects, the one or more UEs receiving the multiple SCell dedicated information may be configured to utilize the parameters received for each SCell indicated by the multiple SCell dedicated information for SCell configuration. In certain aspects, single SCell dedicated information may also be included in the configuration message. In certain aspects, the single SCell dedicated information may be used to indicate certain parameters for SCell configuration not indicated in the multiple SCell dedicated information.

In certain aspects, single SCell dedicated information may take precedence over multiple SCell dedicated information. For example, if the single SCell dedicated information indicates a certain setting or value for a parameter for a single SCell for one or more UEs, and the multiple SCell dedicated information indicates a different setting or value for the same parameter for multiple SCells including the single SCell for one or more UEs, the one or more UEs use the setting or value indicated in the single SCell dedicated information for configuration of the single SCell.

Figure 8:
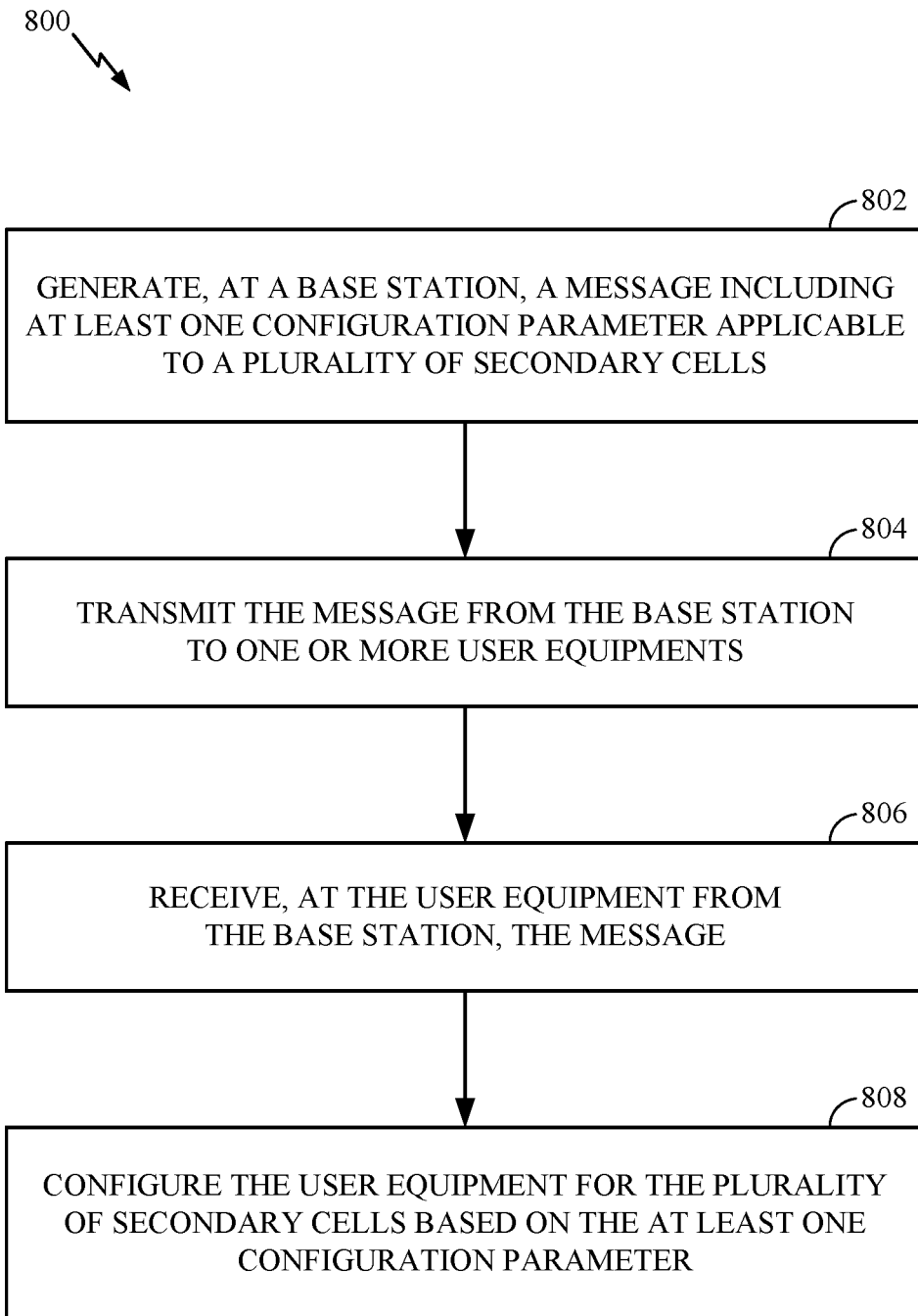
FIG. 8 illustrates example operations 800 for including configuration information that is applicable to multiple SCells in a configuration message sent from an eNB, in accordance with certain aspects of the present disclosure.

FIG. 8 illustrates example operations 800 for including configuration information that is applicable to multiple SCells in a configuration message sent from an eNB, in accordance with certain aspects of the present disclosure.

At 802, the eNB generates a message including at least one configuration parameter applicable to a plurality of secondary cells of the eNB. At 804, the eNB transmits the message to one or more UEs. At 806, a UE receives the message. At 808, the UE configures itself for the plurality of SCells based on the at least one configuration parameter.

As discussed, UE 102 may be configured to handover from a source eNB 106 (e.g., that does or does not support CA) to a different target eNB 106 (e.g., that does support CA). For example, UE 102 may be connected to source eNB 106 (e.g., in a RRC connected state) and then handover to target eNB 106. In certain aspects, both source eNB 106 and UE 102 maintain some context information (e.g., C-RNTI) to enable return of the UE 102 to source eNB 106 in case the handover fails. In certain aspects, random access channel (RACH)-less handover is not configured for the UE 102 and/or eNBs 106. In such aspects, UE 102 may access the target cell of target eNB 106 via RACH following a contention-free procedure using a dedicated RACH preamble or following a contention-based procedure if dedicated RACH preambles are not available. If RACH-less handover is configured for the UE 102 and/or eNBs 106, UE 102 may access the target cell via an uplink grant pre-allocated to the UE 102 in a message (e.g., RRC message) received from the source eNB 106. In such aspects, if the UE does not receive a pre-allocated uplink grant in the message, the UE may monitor the PDCCH of the target cell. In certain aspects, if the UE 102 is not able to access the target eNB 106 within a certain time period, the UE 102 initiates a radio link failure on a suitable cell.

Figure 9:
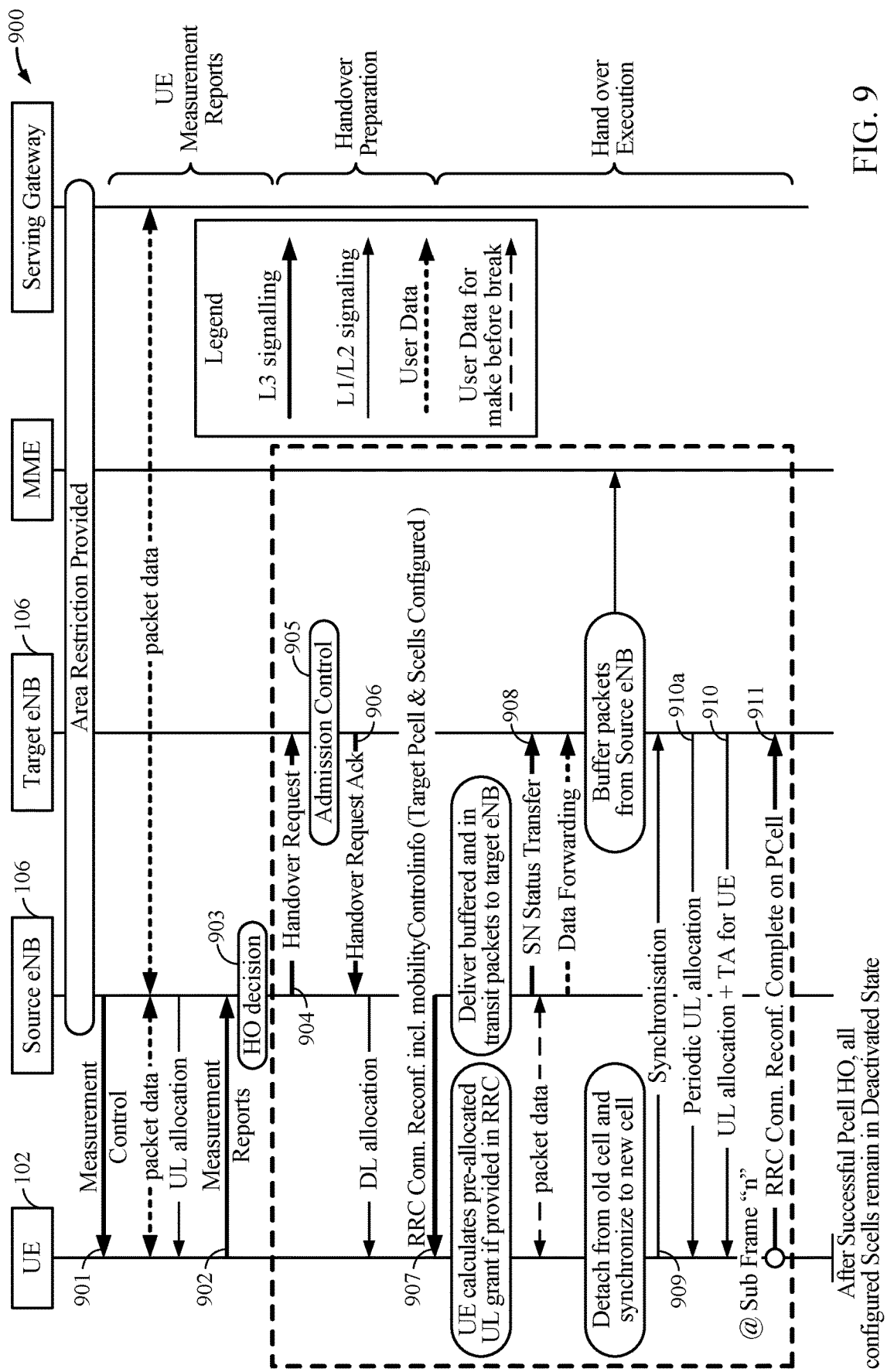
FIG. 9 illustrates an example signal flow diagram for signaling for handover, in accordance with certain aspects of the present disclosure.

FIG. 9 illustrates an example signal flow diagram 900 for signaling for handover, in accordance with certain aspects of the present disclosure. At 901, source eNB 106 sends to UE 102 a measurement control message. The measurement control message may indicate multiple frequencies (e.g., frequency bands, carriers, etc.) that UE 102 should monitor (e.g., perform channel measurements for). The UE 102 may then perform channel measurements on the multiple frequencies. For example, UE 102 may receive signals from one or more potential target eNBs 106 and perform channel measurements based on the received signals. The received signals may indicate an identifier of the eNB from which and/or cell (e.g., PCell or SCell) in which the signal is transmitted. At 902, UE 102 sends measurement report(s) including channel measurements of one or more of the multiple frequencies to the source eNB 106. The measurement reports may include channel measurements associated with identifiers of eNBs and/or cells for which the channel measurements are performed. For example, UE 102 may periodically determine if the channel measurements for a frequency (e.g., for source eNB 106 and/or one or more potential target eNBs 106) meet one or more thresholds for handover (e.g., measurements event thresholds such as A3, A4, A5, etc.) When the channel measurements for a frequency meet the one or more thresholds, the UE 102 sends the measurement report(s) to the source eNB 106. In some aspects, separate measurement reports are sent for each frequency, eNB, and/or cell. In some aspects, a single measurement report includes information for multiple or all frequencies, eNBs, and/or cells.

At 903, based on the received measurement reports, source eNB 106 determines whether UE 102 should perform a handover and selects a target eNB 106 (e.g., having the best channel measurements with respect to the PCell of the target eNB 106) the UE 102 should handover to based on the measurement reports. At 904, source eNB 106 sends to the selected target eNB 106 (e.g., over a backhaul) a handover request message. In certain aspects, the handover request message includes channel measurements from the measurement reports (e.g., all channel measurements or channel measurements associated with the target eNB 106 (e.g., cells of the target eNB 106)). In certain aspects, such channel measurements are sent separately from the handover request. In certain aspects, the channel measurements are indicated as an ordered list of radio quality of cells of the target eNB 106 (with or without the actual channel measurements). In certain aspects, the handover request includes other information (e.g., E-RAB attributes, RRC context, etc.).

At 905, based on the received handover request, target eNB 106 allows UE 102 to handover to the target eNB 106. For example, target eNB 106 generates a message to perform the handover (e.g., RRC message such as a RRCConnectionReconfiguration message including mobilityControlInfo and SCell Configuration Information). The message may include parameters for the UE 102 to perform handover, including PCell and SCell(s) configuration information of the target eNB 106. If RACH-less handover is configured, the RRC message includes timing adjustment indication and optionally pre-allocated uplink grant for accessing the target eNB 106. If pre-allocated uplink grant is not included, the UE 102 may monitor PDCCH of the target eNB 106 to receive an uplink grant. The UE 102 may not need to delay the handover execution for delivering the HARQ/ARQ responses to source eNB 106.

At 906, the target eNB 106 transmits a handover acknowledgment message to the source eNB 106 (e.g., over the backhaul). In certain aspects, the message to perform handover generated by the target eNB 106 is included in the handover acknowledgment message. In certain aspects, the message is transmitted separately from the handover acknowledgment message.

At 907, the source eNB 106 forwards the message to perform handover to the UE 102. If make before break handover is configured, the connection of UE 102 to source eNB 106 is maintained after the UE 102 receives the message before the UE 102 executes initial UL transmission to the target eNB 106. The source eNB 106 may decide when to stop transmitting to the UE 102 for make before break handover.

At 908, the source eNB 106 sends a status transfer message (e.g., SN status transfer message) to the target eNB 106 to convey the uplink PDCP SN receiver status and the downlink PDCP SN transmitter status of E-RABs for which PDCP status preservation applies (i.e., for RLC AM).

At 909, in certain aspects, if RACH-less handover is not configured, after receiving the message to perform handover, UE 102 performs synchronization to the PCell of the target eNB 106 and accesses the target PCell via RACH, following a contention-free procedure if a dedicated RACH preamble was indicated in the message to perform handover (e.g. in the mobilityControlInfo), or following a contention-based procedure if no dedicated preamble was indicated. In certain aspects, UE 102 derives target eNB 106 specific keys and configures the selected security algorithms to be used in the target cell. In certain aspects, of RACH-less handover is configured, UE 106 performs synchronization to the PCell of target eNB 106. In certain aspects, UE 102 derives target eNB 106 specific keys and configures the selected security algorithms to be used in the target cell.

At 910, in certain aspects, if RACH-less handover is not configured, the target eNB responds to the UE 102 with UL allocation and timing advance.

In other aspects, at 910a, if RACH-less handover is configured and the UE 102 did not get the periodic pre-allocated uplink grant in the message to perform handover, the UE 102 receives uplink grant via the PDCCH of the target cell. In certain aspects, the UE 102 uses the first available uplink grant after synchronization to the target cell.

At 911, when the UE 102 has successfully accessed the target cell or received uplink grant when RACH-less handover is configured, the UE 102 sends a reconfiguration complete message (e.g., RRCConnectionReconfiguration-Complete message) to the PCell of the target eNB 106 to confirm the handover. In certain aspects, the UE 102, also includes an uplink Buffer Status Report in the message (e.g., when possible), to indicate that the handover procedure is completed for the UE 102. In certain aspects, the target eNB 106 verifies a C-RNTI sent in the reconfiguration complete message. The target eNB 106 may now begin sending data to the UE 106 on the PCell. In certain aspects, after a successful handover as discussed, configured SCells remain in deactivated state. Accordingly, the target eNB 106 has to send commands (e.g., MAC-CE commands) to UE 102 to activate SCells and then data will be scheduled on SCells.

Certain aspects herein provide techniques to directly signal activating secondary cells for a UE by a base station (e.g., target base station), such as during a handover procedure of the UE from a source base station to a target base station (e.g., as opposed to all secondary cells being deactivated after completion of the handover procedure), which may make SCells available for data scheduling sooner and without additional commands being communicated after handover. Such techniques may similarly be used for directly signaling activating secondary cells for a UE by a base station, such as during initial secondary cell configuration (e.g., as opposed to all secondary cells being deactivated after completion of the initial secondary cell configuration).

For example, if SCells of the eNB 106 (e.g., target eNB 106) have good channel conditions (e.g., meet a threshold) it may be desirable (e.g., if there is enough data available at the eNB 106 or UE 102 for transmission) to enable and signal activation of SCells of the target eNB 106 for UE 102 directly during handover or initial secondary cell configuration, instead of signaling activation the SCells after handover or initial secondary cell configuration. In some aspects, eNB 106 may be configured to convey SCell activation information (e.g., an IE) (e.g., activateScellAfterHO) to a UE 102 during a handover signaling procedure or initial secondary cell configuration to activate SCells of the eNB 106 for the UE 102 during handover or initial secondary cell configuration. In certain aspects, the SCell activation information is SCell specific and identifies one or more SCells to activate. If such SCell activation information is not sent to the UE 102, the UE 102 may default to having the SCells of the eNB 106 in a deactivated state. In certain aspects, the SCell activation information may be a list of SCell IDs to be activated after handover or initial secondary cell configuration. In other aspects, the SCell activation information can be a bitmap indicating which SCell(s) to be activated after handover or initial secondary cell configuration. In yet other aspects, the SCell activation information can indicate all or no SCell(s) should be activated after handover (e.g., using a single bit) or initial secondary cell configuration.

Figure 10:
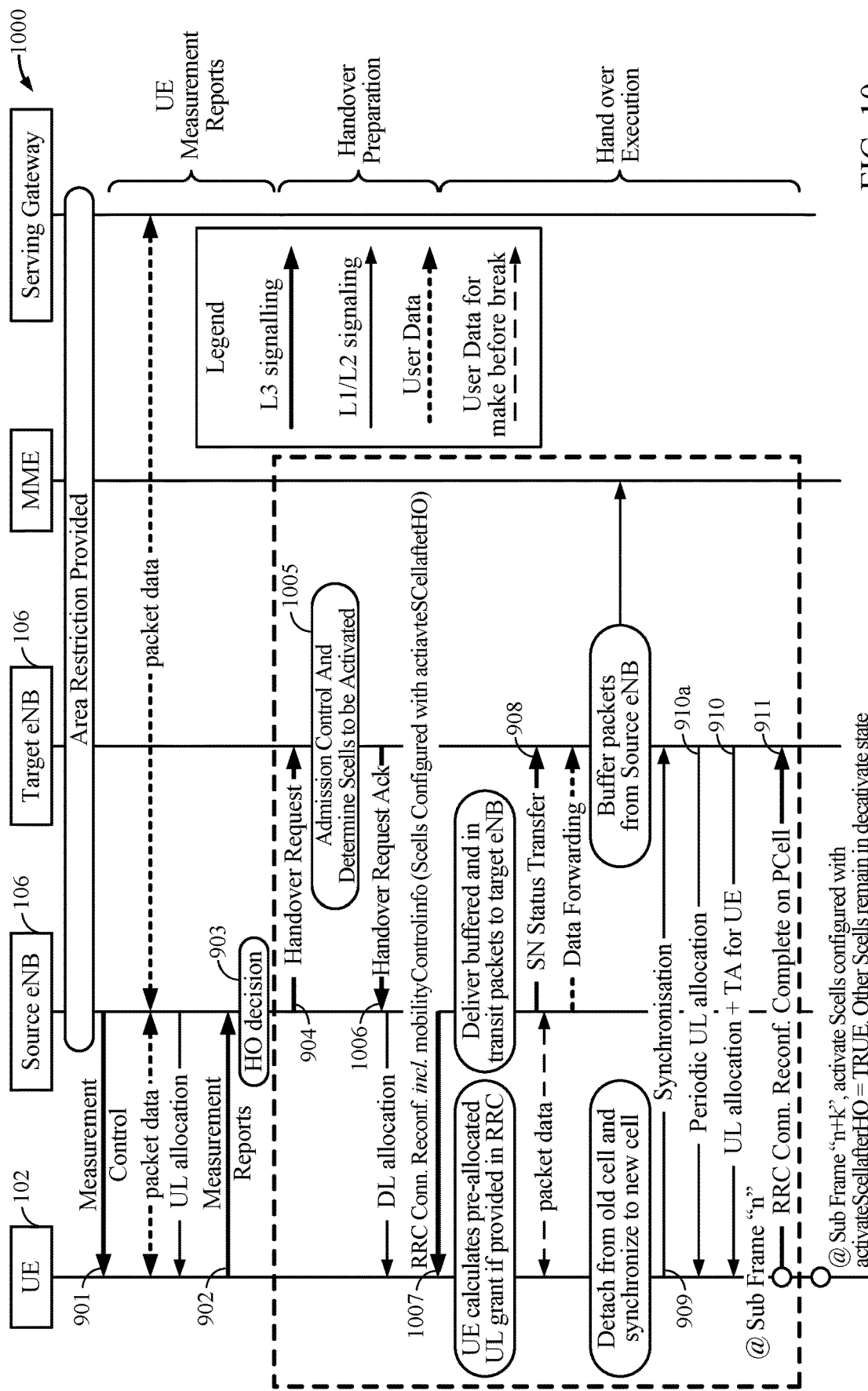
FIG. 10 illustrates an example signal flow diagram for signaling activating SCells of a target eNB at a UE during handover signaling, in accordance with certain aspects of the present disclosure.

FIG. 10 illustrates an example signal flow diagram 1000 for signaling activating SCells of a target eNB at a UE during handover signaling, in accordance with certain aspects of the present disclosure. Similar signaling may be used for activating SCells of an eNB at a UE during initial secondary cell configuration. Signal flow diagram 1000 is similar to signal flow diagram 900. However, at 1005 in addition to performing 905, the target eNB 106 further determines which SCells to activate for UE 102 (e.g., based on the measurement reports from the UE 102). Further, at 1006 in addition to performing 906, either as part of or separate from the handover request acknowledgement, target eNB 106 transmits the SCell activation information to source eNB 106. At 1007 in addition to performing 907, source eNB 106 transmits the SCell activation information to UE 102 as part of or separate from the message to perform handover. UE 102 may utilize the information to activate one or more SCells of the target eNB 106 at some number of frames after 911.

For example, if the UE 102 sends the reconfiguration complete message to the target eNB 106 PCell in subframe n, and if the UE gets an acknowledgement from the PCell, then the UE 106 activates the one or more SCells of the target eNB 106 at subframe n+k, where k can be specified (e.g., depending on FDD or TDD LTE modes).

Figure 11:
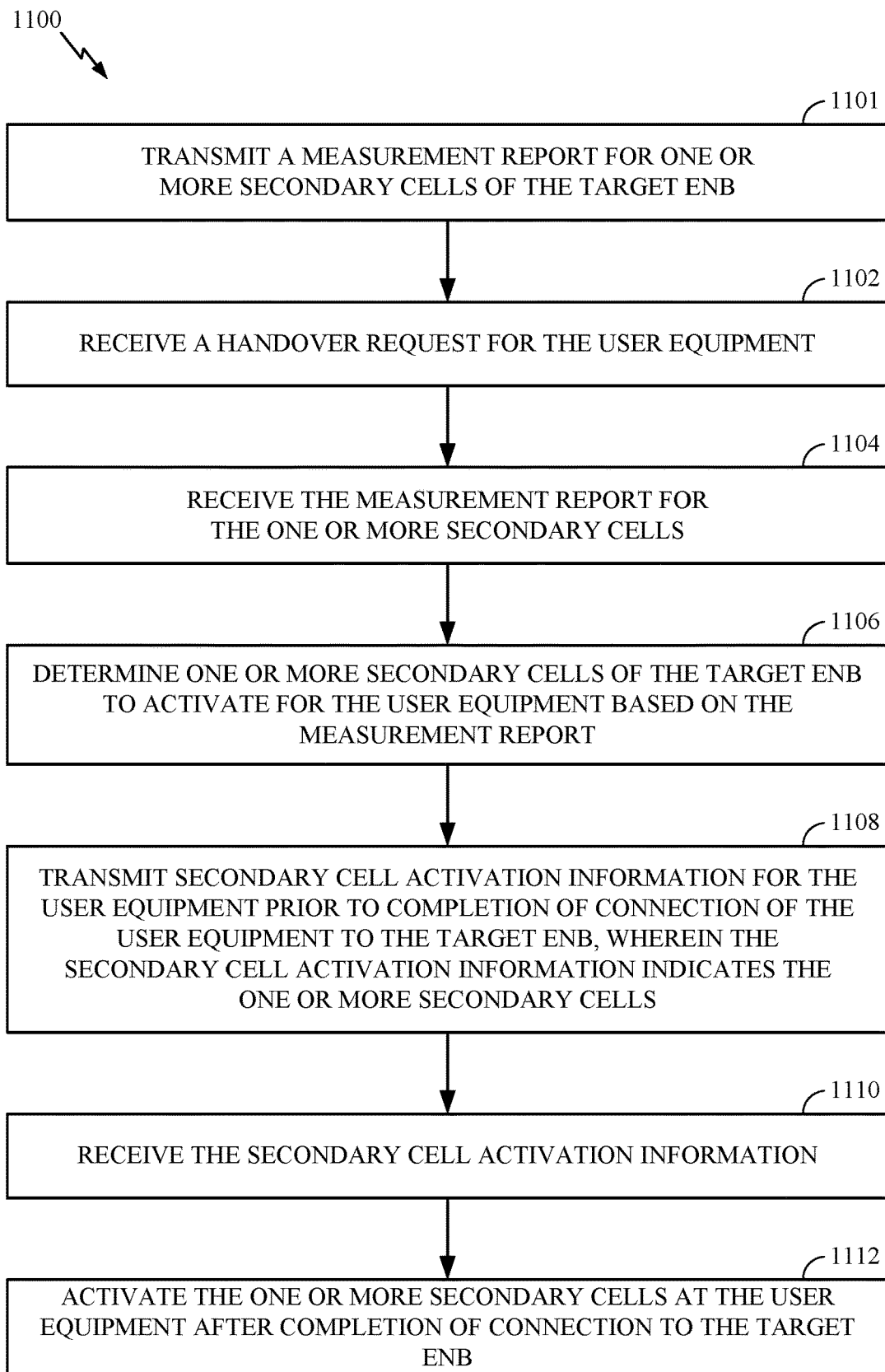
FIG. 11 illustrates example operations for signaling activating SCells of a target eNB at a UE during handover signaling, in accordance with certain aspects of the present disclosure.

FIG. 11 illustrates example operations 1100 for signaling activating SCells of a target eNB at a UE (e.g., during handover signaling or initial secondary cell configuration), in accordance with certain aspects of the present disclosure.

At 1101, the UE transmits a measurement report for one or more secondary cells of the target eNB. Optionally, for a handover request, at 1102, the target eNB receives a handover request for the user equipment. At 1104, the target eNB receives a measurement report for the one or more secondary cells for the user equipment. At 1106, the target eNB determines one or more secondary cells of the target eNB to activate for the user equipment based on the measurement report (e.g., and the handover request). At 1108, the target eNB transmits secondary cell activation information for the user equipment prior to completion of connection (e.g., handover) of the user equipment to the target eNB, wherein the secondary cell activation information indicates the one or more secondary cells. At 1110, the user equipment receives the secondary cell activation information. At 1112, the user equipment activates the one or more secondary cells at the user equipment after completion of connection to the target eNB.

Figure 12:
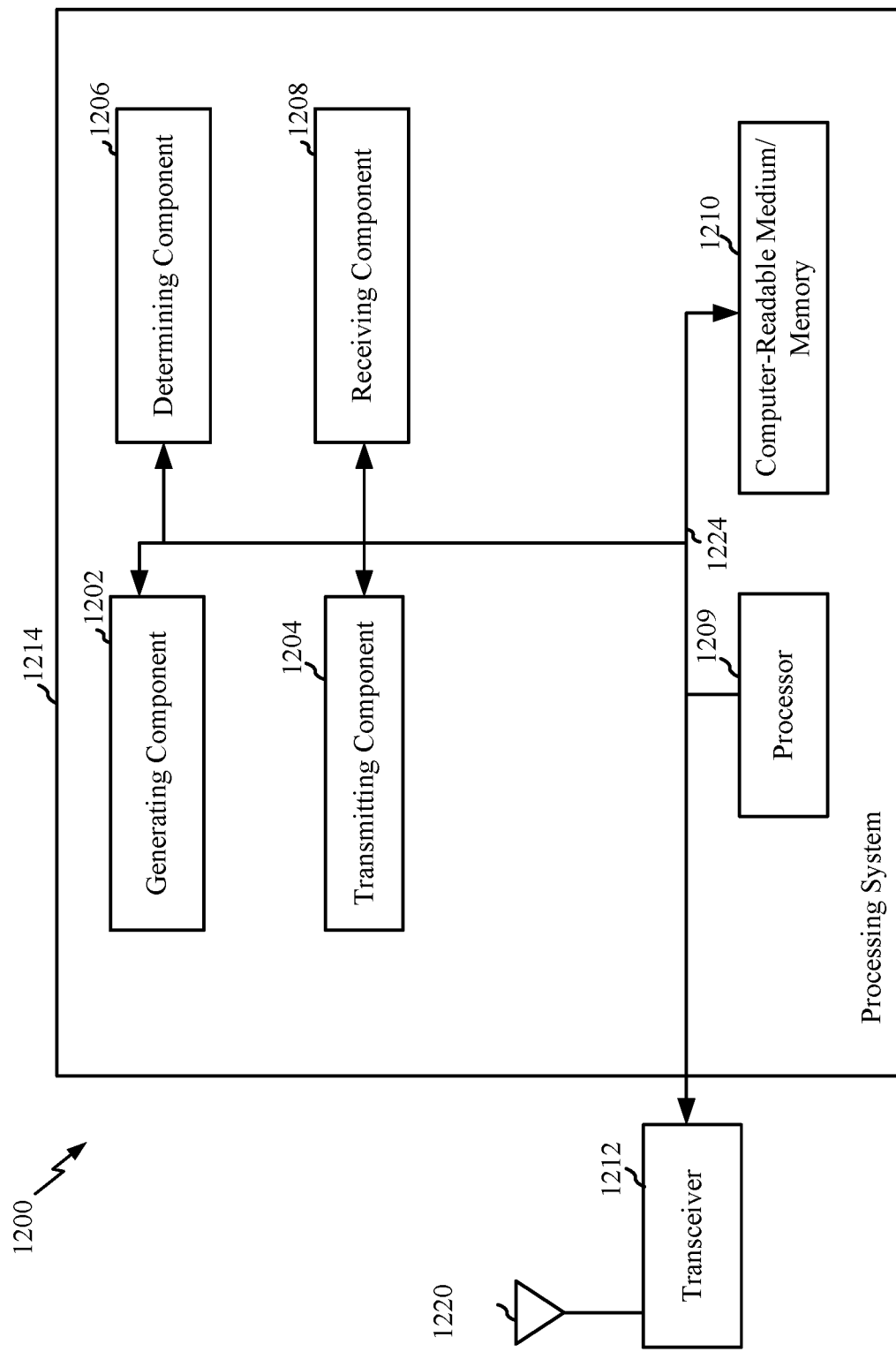
FIG. 12 illustrates a communications device that may include various components configured to perform operations for the techniques disclosed herein, such as one or more of the operations illustrated in FIGS. 8 and 11.

FIG. 12 illustrates a communications device 1200 that may include various components (e.g., corresponding to means-plus-function components) configured to perform operations for the techniques disclosed herein, such as one or more of the operations illustrated in FIGS. 8 and 11. The communications device 1200 includes a processing system 1214 coupled to a transceiver 1212. The transceiver 1212 is configured to transmit and receive signals for the communications device 1200 via an antenna 1220, such as the various signals described herein. The processing system 1214 may be configured to perform processing functions for the communications device 1200, including processing signals received and/or to be transmitted by the communications device 1200.

The processing system 1214 includes a processor 1209 coupled to a computer-readable medium/memory 1210 via a bus 1224. In certain aspects, the computer-readable medium/memory 1210 is configured to store instructions that when executed by processor 1209, cause the processor 1209 to perform one or more of the operations illustrated in FIGS. 8 and 11, or other operations for performing the various techniques discussed herein.

In certain aspects, the processing system 1214 further includes a generating component 1202 for performing one or more of the operations illustrated at 802 in FIG. 8. Additionally, the processing system 1214 includes a transmitting component 1204 for performing one or more of the operations illustrated at 804 or 1108 in FIG. 8 or 11, respectively. The processing system 1214 also includes a determining component 1206 for performing one or more of the operations illustrated at 1106 in FIG. 11. The processing system 1214 also includes a receiving component 1208 for performing one or more of the operations illustrated at 1104 in FIG. 11.

The generating component 1202, transmitting component 1204, determining component 1206, and receiving component 1208 may be coupled to the processor 1209 via bus 1224. In certain aspects, the generating component 1202, transmitting component 1204, determining component 1206, and receiving component 1208 may be hardware circuits. In certain aspects, the generating component 1202, transmitting component 1204, determining component 1206, and receiving component 1208 may be software components that are executed and run on processor 1209.

Figure 13:
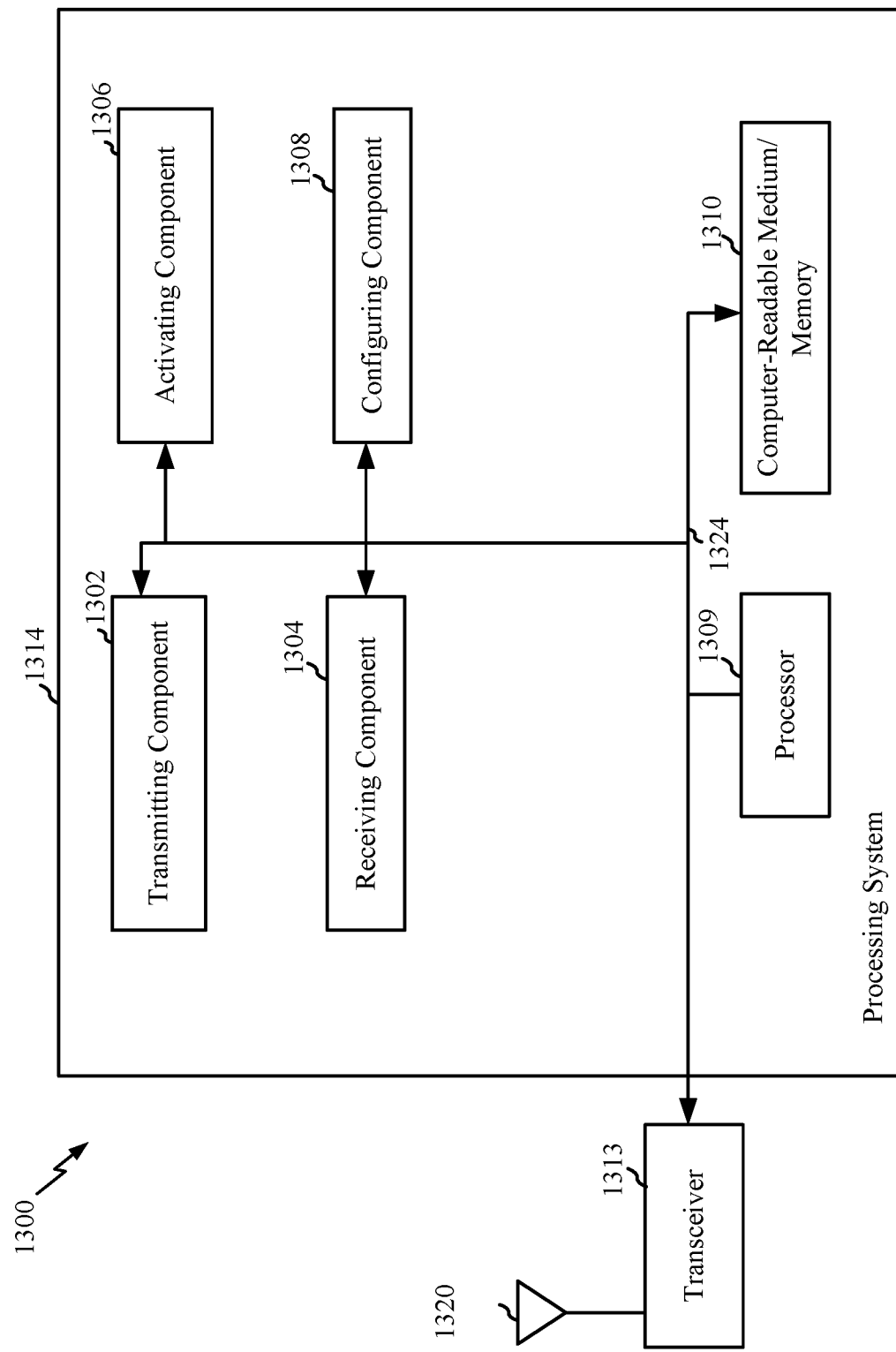
FIG. 13 illustrates a communications device that may include various components configured to perform operations for the techniques disclosed herein, such as one or more of the operations illustrated in FIGS. 8 and 11.

FIG. 13 illustrates a communications device 1300 that may include various components (e.g., corresponding to means-plus-function components) configured to perform operations for the techniques disclosed herein, such as one or more of the operations illustrated in FIGS. 8 and 11. The communications device 1300 includes a processing system 1314 coupled to a transceiver 1313. The transceiver 1313 is configured to transmit and receive signals for the communications device 1300 via an antenna 1320, such as the various signals described herein. The processing system 1314 may be configured to perform processing functions for the communications device 1300, including processing signals received and/or to be transmitted by the communications device 1300.

The processing system 1314 includes a processor 1309 coupled to a computer-readable medium/memory 1310 via a bus 1324. In certain aspects, the computer-readable medium/memory 1310 is configured to store instructions that when executed by processor 1309, cause the processor 1309 to perform one or more of the operations illustrated in FIGS. 8 and 11, or other operations for performing the various techniques discussed herein.

In certain aspects, the processing system 1314 further includes a transmitting component 1302 for performing one or more of the operations illustrated at 1101 in FIG. 11. Additionally, the processing system 1314 includes a receiving component 1304 for performing one or more of the operations illustrated at 806 or 1110 in FIG. 8 or 11, respectively. The processing system 1314 also includes an activating component 1306 for performing one or more of the operations illustrated at 1112 in FIG. 11. The processing system 1314 also includes a configuring component 1308 for performing one or more of the operations illustrated at 808 in FIG. 8.

The transmitting component 1302, receiving component 1304, activating component 1306, and configuring component 1308 may be coupled to the processor 1309 via bus 1324. In certain aspects, the transmitting component 1302, receiving component 1304, activating component 1306, and configuring component 1308 may be hardware circuits. In certain aspects, the transmitting component 1302, receiving component 1304, activating component 1306, and configuring component 1308 may be software components that are executed and run on processor 1309.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for configuring a plurality of secondary cells of a base station for a user equipment, the method comprising:
    receiving, at the user equipment from the base station, a message including at least one configuration parameter applicable to the plurality of secondary cells and at least one second configuration parameter applicable to a first secondary cell of the plurality of secondary cells, wherein the at least one second configuration parameter conflicts with the at least one configuration parameter with respect to the first secondary cell; and
    configuring the user equipment for the plurality of secondary cells based on the at least one configuration parameter and the at least one second configuration parameter, wherein the at least one second configuration parameter is used by the user equipment for the first secondary cell instead of the at least one configuration parameter.

2. The method of claim 1, wherein the message comprises a RRC Connection Reconfiguration message.

3. The method of claim 2, wherein the at least one configuration parameter is indicated in an information element.

4. The method of claim 1, wherein the message indicates that the at least one configuration parameter is applicable to all user equipments served by the plurality of secondary cells.

5. The method of claim 1, wherein the message indicates that the at least one configuration parameter is applicable to one or more specific user equipments including the user equipment served by the plurality of secondary cells.

6. The method of claim 1, wherein the message includes an identifier of the plurality of secondary cells, wherein the plurality of secondary cells is a subset of multiple secondary cells, wherein the identifier is associated with the at least one configuration parameter applicable to the plurality of secondary cells.

7. The method of claim 6, wherein the message includes a second identifier of a second plurality of secondary cells, wherein the second plurality of secondary cells is a second subset of the multiple secondary cells and is different from the plurality of secondary cells, wherein the message includes at least one third configuration parameter applicable to the second plurality of secondary cells, wherein the second identifier is associated with the at least one third configuration parameter applicable to the second plurality of secondary cells.

8. A user equipment comprising:
    a memory; and
    a processor configured to:
        receive from a base station a message including at least one configuration parameter applicable to a plurality of secondary cells of the base station and at least one second configuration parameter applicable to a first secondary cell of the plurality of secondary cells, wherein the at least one second configuration parameter conflicts with the at least one configuration parameter with respect to the first secondary cell; and
        configure the user equipment for the plurality of secondary cells based on the at least one configuration parameter and the at least one second configuration parameter, wherein the at least one second configuration parameter is used by the user equipment for the first secondary cell instead of the at least one configuration parameter.

9. The user equipment of claim 8, wherein the message comprises a RRC Connection Reconfiguration message.

10. The user equipment of claim 9, wherein the at least one configuration parameter is indicated in an information element.

11. The user equipment of claim 8, wherein the message indicates that the at least one configuration parameter is applicable to all user equipments served by the plurality of secondary cells.

12. The user equipment of claim 8, wherein the message indicates that the at least one configuration parameter is applicable to one or more specific user equipments including the user equipment served by the plurality of secondary cells.

13. The user equipment of claim 8, wherein the message includes an identifier of the plurality of secondary cells, wherein the plurality of secondary cells is a subset of multiple secondary cells, wherein the identifier is associated with the at least one configuration parameter applicable to the plurality of secondary cells.

14. The user equipment of claim 13, wherein the message includes a second identifier of a second plurality of secondary cells, wherein the second plurality of secondary cells is a second subset of the multiple secondary cells and is different from the plurality of secondary cells, wherein the message includes at least one third configuration parameter applicable to the second plurality of secondary cells, wherein the second identifier is associated with the at least one third configuration parameter applicable to the second plurality of secondary cells.

15. A user equipment comprising:
    means for receiving from a base station a message including at least one configuration parameter applicable to a plurality of secondary cells of the base station and at least one second configuration parameter applicable to a first secondary cell of the plurality of secondary cells, wherein the at least one second configuration parameter conflicts with the at least one configuration parameter with respect to the first secondary cell; and
    means for configuring the user equipment for the plurality of secondary cells based on the at least one configuration parameter and the at least one second configuration parameter, wherein the at least one second configuration parameter is used by the user equipment for the first secondary cell instead of the at least one configuration parameter.

16. The user equipment of claim 15, wherein the message comprises a RRC Connection Reconfiguration message.

17. The user equipment of claim 16, wherein the at least one configuration parameter is indicated in an information element.

18. The user equipment of claim 15, wherein the message indicates that the at least one configuration parameter is applicable to all user equipments served by the plurality of secondary cells.

19. The user equipment of claim 15, wherein the message indicates that the at least one configuration parameter is applicable to one or more specific user equipments including the user equipment served by the plurality of secondary cells.

20. The user equipment of claim 15, wherein the message includes an identifier of the plurality of secondary cells, wherein the plurality of secondary cells is a subset of multiple secondary cells, wherein the identifier is associated with the at least one configuration parameter applicable to the plurality of secondary cells.

21. The user equipment of claim 20, wherein the message includes a second identifier of a second plurality of secondary cells, wherein the second plurality of secondary cells is a second subset of the multiple secondary cells and is different from the plurality of secondary cells, wherein the message includes at least one third configuration parameter applicable to the second plurality of secondary cells, wherein the second identifier is associated with the at least one third configuration parameter applicable to the second plurality of secondary cells.

22. A non-transitory computer-readable medium having instructions stored thereon that when executed by a processor cause the processor to perform a method for configuring a plurality of secondary cells of a base station for a user equipment, the method comprising:

receiving, at the user equipment from the base station, a message including at least one configuration parameter applicable to the plurality of secondary cells and at least one second configuration parameter applicable to a first secondary cell of the plurality of secondary cells, wherein the at least one second configuration parameter conflicts with the at least one configuration parameter with respect to the first secondary cell; and configuring the user equipment for the plurality of secondary cells based on the at least one configuration parameter and the at least one second configuration parameter, wherein the at least one second configuration parameter is used by the user equipment for the first secondary cell instead of the at least one configuration parameter.

23. The non-transitory computer-readable medium of claim 22, wherein the message indicates that the at least one configuration parameter is applicable to all user equipments served by the plurality of secondary cells.

24. The non-transitory computer-readable medium of claim 22, wherein the message indicates that the at least one configuration parameter is applicable to one or more specific user equipments including the user equipment served by the plurality of secondary cells.

25. The non-transitory computer-readable medium of claim 22, wherein the message includes an identifier of the plurality of secondary cells, wherein the plurality of secondary cells is a subset of multiple secondary cells, wherein the identifier is associated with the at least one configuration parameter applicable to the plurality of secondary cells.

26. The non-transitory computer-readable medium of claim 25, wherein the message includes a second identifier of a second plurality of secondary cells, wherein the second plurality of secondary cells is a second subset of the multiple secondary cells and is different from the plurality of secondary cells, wherein the message includes at least one third configuration parameter applicable to the second plurality of secondary cells, wherein the second identifier is associated with the at least one third configuration parameter applicable to the second plurality of secondary cells.

* * * * *